US006555780B1

(12) United States Patent
Kim et al.

(10) Patent No.: US 6,555,780 B1
(45) Date of Patent: Apr. 29, 2003

(54) METHOD FOR MONITORING THE SIZE VARIATION AND THE FOCUS SHIFT OF A WELD POOL IN LASER WELDING

(75) Inventors: Cheol-Jung Kim, Daejeon-si (KR); Sung-Hoon Baik, Daejeon-si (KR); Min-Suk Kim, Daejeon-si (KR); Chin-Man Chung, Daejeon-si (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 10/006,140

(22) Filed: Dec. 10, 2001

(30) Foreign Application Priority Data

Nov. 28, 2001 (KR) ..................................... 2001-0074596

(51) Int. Cl.⁷ ............................................... B23K 26/20

(52) U.S. Cl. .............................. 219/121.64; 219/121.83

(58) Field of Search .......................... 219/121.6, 121.63, 219/121.64, 121.73, 121.74, 121.83, 121.85

(56) References Cited

U.S. PATENT DOCUMENTS 6,188,041 B1 * 2/2001 Kim et al.
6,344,625 B1 * 2/2002 Kim et al.

* cited by examiner

Primary Examiner—Samuel M. Heinrich
(74) Attorney, Agent, or Firm—Arent Fox Kintner Plotkin & Kahn

(57) ABSTRACT

In a laser welding, a laser beam is focused on a workpiece by a focusing lens or lenses. The focusing lens or lenses image an aperture liming the size of the laser beam on the workpiece and the size of focused laser beam is the image size of the aperture on the workpiece at the wavelength of the laser. A weld pool is generated by the interaction of the focused laser beam and the workpiece. Due to the thermal conduction of the workpiece, the size of the weld pool is generally not the same as the size of the focused laser beam and varies with the power of the laser or with the focus shift of the focusing lens or lenses. The weld pool irradiates a thermal radiation. The thermal radiation is measured back through the focusing lens or lenses and through the aperture limiting the size of the laser beam or any other aperture limiting a size of the thermal radiation to be measured in three spectral bands with single element detectors. Due to the chromatic aberration of the focusing lens or lenses, the transmittance of each spectral band of the thermal radiation varies with the size variation and with the focus position of a weld pool and the spectral band signals measured with single-element detectors vary if the size and/or the focus position of a weld pool varies. However, the chromatic aberration of the focusing lens or lenses is usually unknown and is not easy to measure. A method to monitor the size variation and/or the focus position of a weld pool is disclosed wherein the effects of the chromatic aberration are measured experimentally and the size variation of a weld pool is monitored independently from the focus shift of the focusing lens or lenses and the focus position of a weld pool is monitored independently from the power variation of the laser.

5 Claims, 12 Drawing Sheets

METHOD FOR MONITORING THE SIZE VARIATION AND THE FOCUS SHIFT OF A WELD POOL IN LASER WELDING

BACKGROUND OF THE INVENTION

1. Field of the Invention

The present invention relates in general to weld process monitoring techniques, and more particularly to improved methods for real-time monitoring of thermal radiation of a weld pool to monitor a size variation and a focus shift of the weld pool for weld process control, utilizing the chromatic aberration of focusing lens or lenses.

2. Description of the Prior Art

The application of high power Nd:YAG lasers for precision welding in industry has been growing quite fast these days in diverse areas such as the automobile, the electronics and the aerospace industries. Nowadays, a Nd:YAG laser with as much as 10 kW of average power is available in the market and the fiber delivery of it makes it useful for many remote applications. On the other hand, these diverse applications also require the new developments for the precise control and the reliable process monitoring. Due to the hostile environment in laser welding, a remote monitoring is required and man acoustic and optical remote monitoring techniques have been developed. However, acoustic monitoring is not suitable for the application in a factory due to the acoustic interference from environmental noise. Therefore, optical monitoring is preferred in industrial applications.

In a laser welding, a laser beam is focused on a workpiece by a focusing lens or lenses. The focusing lens or lenses image an aperture liming the size of the laser beam on the workpiece and the size of focused laser beam is the image size of the aperture on the workpiece at the wavelength of the laser. A weld pool is generated by the interaction of the focused laser beam and the workpiece. Due to the thermal conduction of the workpiece, the size of the weld pool is generally not the same as the size of the focused laser beam and varies with the power of the laser or with the focus shift of the focusing lens or lenses. The weld pool radiates a thermal radiation. Many optical monitoring methods have been developed measuring the thermal radiation from a weld pool.

As to the optical monitoring, two approaches have been followed: one monitors the image of a weld pool with a CCD or an infrared camera and the other monitors the thermal radiation from a weld pool with one or more single-element detectors. The monitoring of image requires the fast data processing and is quite complicated and expensive to be implemented. Furthermore, the monitoring of image is not applicable to a laser welding with a laser delivery fiber because the image of a weld pool can not be transmitted through a single-core laser delivery fiber. On the other hand, the monitoring of thermal radiation is simple and cheap to be implemented, and fast and robust for industrial applications. However, the information on a weld pool status in the thermal radiation monitoring is limited compared to the image monitoring. Therefore, several spectral bands of thermal radiation from ultraviolet to infrared have been monitored with a plurality of detectors to widen the information on a weld pool status. Examples of such method for weld monitoring can be found in U.S. Pat. Nos. 4,446,354, 5,155,329, 5,272,312, 5,360,960, 5,506,386, 5,651,903, 5,674,415, 5,681,490 and 5,728,992.

However, these methods could provide some information on the change in the status of a weld pool, but could not provide the information on the focus shift of a focusing lens or lenses to maintain a uniform laser welding. On the other hand, chromatic aberration of a lens or lenses has been used in the focus control of a lens or lenses as shown in U.S. Pat. No. 4,992,859 and has also been used in the distance measurement or in the distance control as shown in U.S. Pat. No. 5,785,651 or in U.S. Pat. No. 5,218,193. In the monitoring of a laser welding, U.S. Pat. No. 5,850,068 could provide the information on the focus shift of a focusing lens or lenses using the chromatic aberration of the focusing lens or lenses by subtracting one spectral band signal from the other spectral band signal. However, U.S. Pat. No. 5,850,068 could not provide the information on the size variation of a weld pool. Furthermore, the information on the focus shift of a focusing lens or lenses provided by U.S. Pat. No. 5,850,068 would be incorrect if the power of a laser is varied because the subtraction of one spectral band signal from the other spectral band signal is doubled if the thermal radiation intensity is doubled by the increase of laser power even if the focus position of a focusing lens or lenses is not shifted. The information on the focus shift of a focusing lens or lenses provided by U.S. Pat. No. 5,850,068 would also be incorrect if the size of a weld pool is varied during a laser welding because the focus position of the highest intensity of each spectral band signal shifts as the size of a weld pool varies and the error signal changes even if the focus position of a focusing lens or lenses are not shifted.

The variation of a laser power can be easily monitored at the laser unit itself, but it is not easy to monitor the variation of a laser power at a workpiece due to the absorption by mirrors or lenses in the path of laser delivery. Therefore, a focus shift monitoring independent of the size variation of a weld pool is required for industrial laser welding applications.

As to the image monitoring of a weld pool using a CCD or an infrared camera, the size of a weld pool provides important information on the status of a weld pool. It can provide the information on the change of a laser power at a workpiece and also the information on the weld depth. If a variation of weld pool size is measured, the variation of weld pool size can be compensated by adjusting the laser power. However, the size of a weld pool measured with a CCD or an infrared camera depends on the focus shift of a workpiece. If the focus position of a workpiece is shifted during a laser welding, the size of a weld pool measured with a CCD or an infrared camera varies and the information on the status of a weld pool becomes incorrect. Therefore, a size monitoring of a weld pool independent of the focus shift of a workpiece is required for industrial laser welding applications.

U.S. Pat. No. 5,875,026, Korean Pat. No. 0193,276 and Japanese Pat. 2,895,021 disclosed a method measuring the size variation and the focus shift of an extended radiation source using the chromatic filtering wherein the chromatic aberration of imaging optics is used to provide the information on the size variation and the focus shift of an extended radiation source by measuring spectral band signals of thermal radiation through the imaging optics and through an aperture. The variations of the transmittances of the spectral band signals through the imaging optics and through the aperture are used in providing the information on the size variation and the focus shift of an extended radiation source.

U.S. Pat. No. 6,188,041 used the chromatic filtering disclosed in U.S. Pat. No. 5,875,026, Korean Pat. No. 0193276 and Japanese Pat. 2895021 to provide the size variation and the focus shift of a weld pool in a pulsed laser welding wherein the size of a weld pool could be reduced between the laser pulses due to the thermal conduction cooling through a workpiece. In U.S. Pat. No. 6,188,041, an algorithm was disclosed wherein a function obtained from the transmittances of the spectral bands for the size measurement of a weld pool provided a reference size which is usually the same as the size of a focused laser beam so that the size of a weld pool could be measured from the reference size by comparing a value obtained from the processed spectral band signals with another value of the function obtained from the transmittances of the spectral bands for the size measurement and another algorithm was disclosed wherein another function obtained from the transmittances of the spectral bands for the focus shift measurement of a weld pool provided the information on the focus shift of a weld pool by comparing a value obtained from the processed spectral band signals with another value obtained from another function obtained from the transmittances of the spectral bands for the focus shift measurement. In U.S. Pat. No. 6,188,041, the wavelengths of spectral bands and the timings to measure the spectral band signals were optimized to measure the size variation of a weld pool independently from the focus shift of a weld pool and to measure the focus shift of a weld pool independently from the size variation of a weld pool. These features were possible because in a pulsed laser welding the size of a weld pool is reduced between the laser pulses due to the thermal conduction cooling through the workpiece. However, in a continuous laser welding, the size of a weld pool is generally larger than the size of a focused laser beam and does not vary much except at the beginning of a laser welding. Therefore, the algorithms and the optimization in the selection of the wavelengths of spectral bands in U.S. Pat. No. 6,188,041 could not be applied in a continuous laser welding. In U.S. patent application Ser. No. 09/589,134 and Korean Pat. Appl. No. 10-2000-0029230, the algorithms and the optimization in the selection of the wavelengths of spectral bands were generalized to be applicable to a continuous laser welding if the curvatures and materials of focusing lenses were known. However, the curvatures and materials of focusing lenses are usually not known in industrial laser welding applications and the development of a method to overcome this problem is required in industry.

SUMMARY OF THE INVENTION

Hence, it is the fundamental object of the present invention to provide a method whereby an independent monitoring of the size variation and/or the focus shift of a weld pool in a laser welding, wherein the curvatures and materials of focusing lenses are unknown and the chromatic aberration can not be calculated, can be obtained in a manner which is simple and suitable for industrial applications. It is another object of the present invention to provide a method wherein a uniform laser welding is obtained by compensating the size variation with a laser power control and by controlling the position of a weld pool in focus position.

These objects are satisfied by utilizing the chromatic filtering of the thermal radiation of a weld pool. A method for monitoring the size variation and the focus shift of a weld pool is provided for a laser welding wherein the size variation of a weld pool is monitored independently from the focus shift of a weld pool and the focus shift of a weld pool is monitored independently from the size variation of a weld pool. In a laser welding, a weld pool is generated on a workpiece by transmitting a laser beam through an aperture which limits a size of a laser beam and focusing transmitted laser beam with at least one lens with some chromatic aberration but minimum spherical aberration on a workpiece. The thermal radiation from a weld pool is measured at three spectral bands through at least one focusing lens and through the aperture which limits a size of a laser beam or through any other aperture which limits a size of a weld pool wherein the thermal radiation is measured with single-element detectors after the thermal radiation is separated from the reflected laser beam with a dichromatic mirror, after splitting the spectral bands of the thermal radiation with dichromatic mirrors and beam splitters and after filtering each spectral band with a narrow band-pass optical filter. A distal end of an optical fiber can be used as an aperture for a laser deliverable through an optical fiber.

In a laser welding, a laser beam is focused on a workpiece by a focusing lens or lenses. The focusing lens or lenses image an aperture limiting the size of the laser beam on the workpiece and the size of focused laser beam is the image size of the aperture on the workpiece at the wavelength of the laser. A weld pool is generated by the interaction of the focused laser beam and the workpiece. Due to the thermal conduction of the workpiece, the size of the weld pool is generally not the same as the size of the focused laser beam and varies with the power of the laser or with the focus shift of the focusing lens or lenses. The weld pool radiates a thermal radiation according to the blackbody radiation law and the spectral dependence of the thermal radiation can be estimated. Due to the chromatic aberration of the focusing lens or lenses, the transmittance of each spectral band of the thermal radiation varies with the size variation and with the focus position of a weld pool and the spectral band signals measured with single-element detectors vary if the size and/or the focus position of a weld pool varies. The transmittance of a thermal radiation on a weld pool through focusing lens or lenses and through an aperture can be calculated as a function of position on the weld pool at each spectral band if the curvatures and materials of the focusing lens or lenses are known for a plurality of focus shifted positions of the weld pool. Furthermore, the spectral band signals follow the blackbody radiation law so that the dependence of the spectral band signals on the size variation and the focus shift of a weld pool can be estimated using the transmittance functions of the spectral bands.

For a focus shift monitoring, the ratio of two spectral band signals, one in the shorter wavelength than the laser wavelength and the other in the longer wavelength, is used wherein the transmittance functions of the two spectral bands are as same as possible so that the focus shift monitoring becomes independent from the size variation of a weld pool. However, the transmittance functions can not be calculated if the curvatures and materials of focusing lenses are not known. This invention provides a method to select the wavelengths of two spectral bands for a focus shift monitoring experimentally.

On the other hand, for a size variation monitoring, the wavelength weighted three spectral band signals, one in the shorter wavelength than the laser wavelength, another in the longer wavelength and the other near the laser wavelength, are used wherein the focus shift dependence of the size variation monitoring obtained from the spectral band signals near the laser wavelength and in the shorter wavelength is compensated by the focus shift dependence of the size variation monitoring obtained from the spectral band signals near the laser wavelength and in the longer wavelength, but the sensitivity of the size variation monitoring is enhanced by optimizing the wavelengths of the spectral bands so that the size variation monitoring becomes independent from the focus shift of a weld pool. The compensation parameter can be calculated if the curvatures and materials of focusing lenses are not known. This invention provides a method to determine the compensation parameters experimentally.

In conclusion, the monitoring of the size variation and the focus shift of a weld pool is achieved with a plurality of single-element detectors by utilizing the chromatic filtering of the thermal radiation from a weld pool. The use of a plurality of single-element detectors rather than a CCD or infrared camera makes it very fast to process the data and cheap to be implemented for industrial applications. The monitoring of weld pool size variation can also be used to monitor the weld depth in a laser welding. Furthermore, the monitoring of the size variation of a weld pool is independent from the focus shift of a weld pool and the monitoring of the focus shift of a weld pool is independent from the size variation of a weld pool. In other words, the simultaneous monitoring of the size variation and the focus shift is achieved. The methods developed in the present invention for monitoring the size variation and the focus shift of a weld pool can be applied to both a continuous laser welding and a pulsed laser welding.

These and other features, aspects and advantages of the present invention will become better understood with preference to the following description and appended claims.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

Embodiments of the present invention will now be described in greater detail for a laser welding with 1.06 um Nd:YAG laser with reference to more specific drawings and data, which are for a better understanding of the invention and not for limiting purposes.

Figure 1:
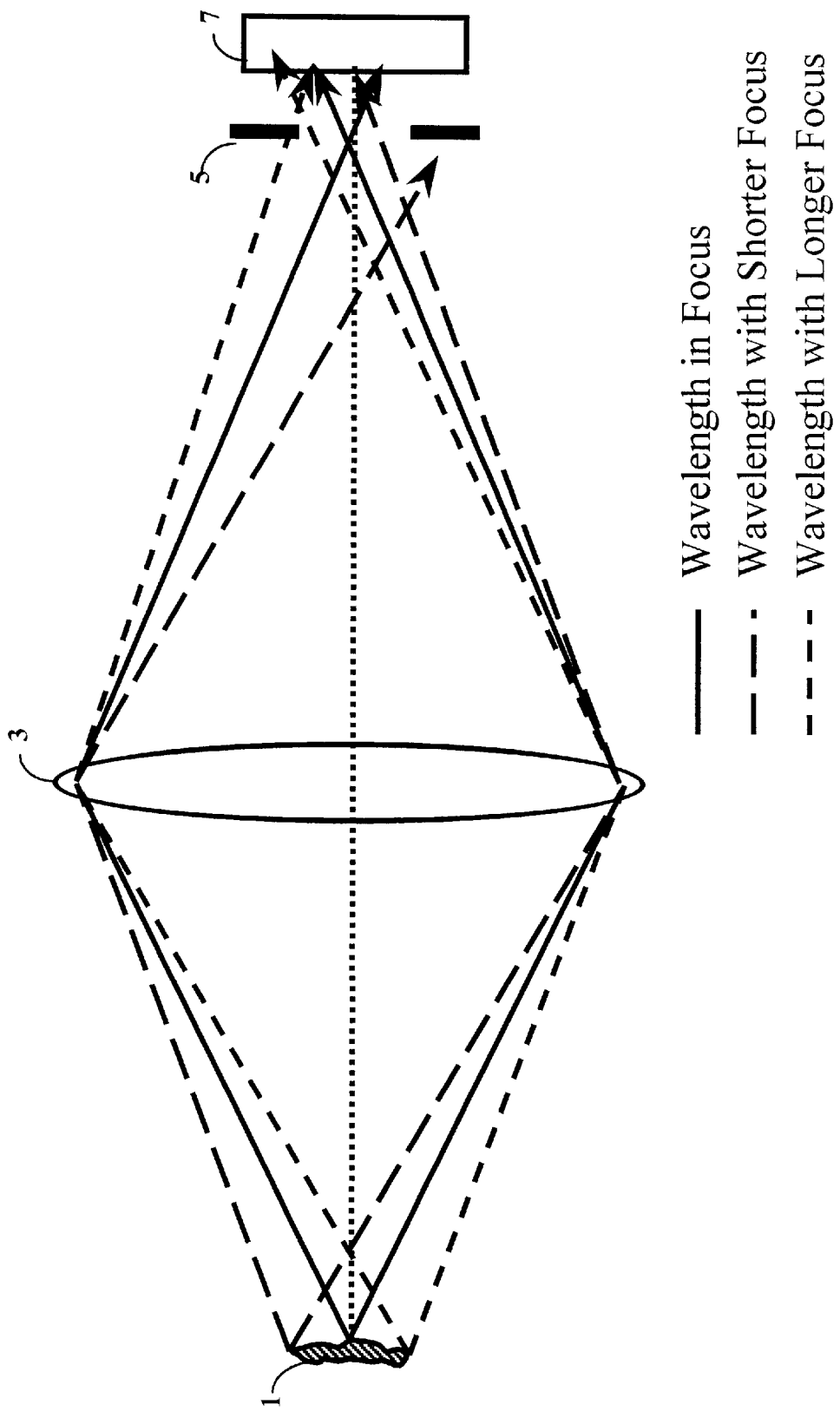
FIG. 1 illustrates the principle of chromatic filtering.

FIG. 1 illustrates the principle of chromatic filtering wherein a thermal radiation from a weld pool 1 is measured through a focusing lens 3 or lenses and through an aperture 5 with detecting unit 7 comprising single element detectors at a plurality of spectral bands. The spectral band signals vary with the focus shift of the weld pool 1 and/or with the size variation of the weld pool 1. The variations of the spectral band signals can be calculated if the curvatures and materials of the focusing lens or lenses are known because the weld pool generates the thermal radiation by the blackbody radiation law. Therefore, the processed spectral band signals can be used in the monitoring of the size variation and the focus shift of a weld pool 1 by comparing the processed spectral band signals with the calculated values obtained from the transmittance functions of the spectral bands.

Figure 2:
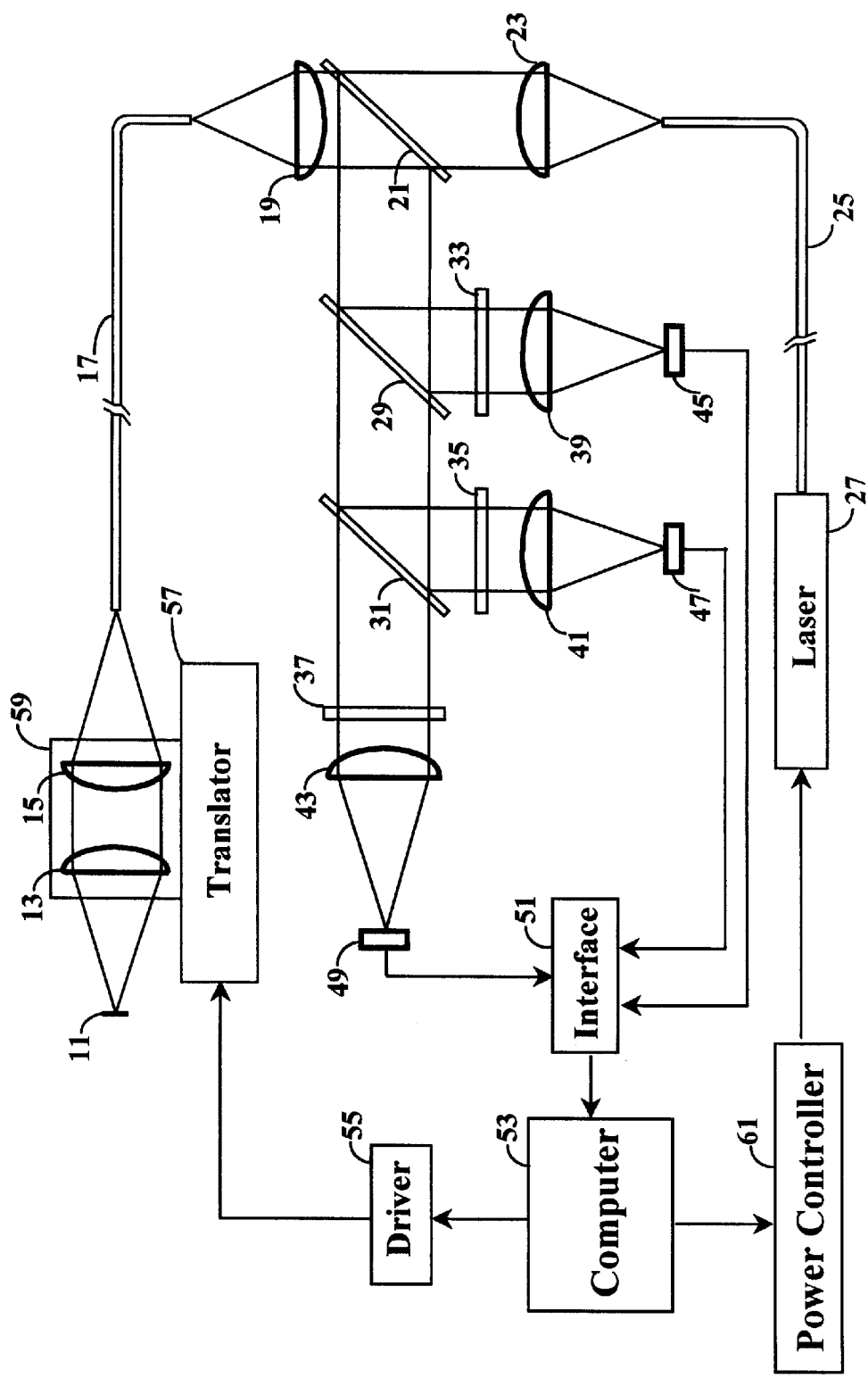
FIG. 2 is a schematic representation of a system for chromatic filtering of thermal radiation from a weld pool in accordance with the present invention.

FIG. 2 illustrates a schematic representation of a system for chromatic filtering of thermal radiation from a weld pool in accordance with the present invention. A weld pool 11 is generated by focusing a laser beam delivered from a laser 27, directly to a dichromatic mirror 21 or through a fiber 25 and a collimating lens 23, with focusing lenses 13 and 15 after being transmitted through a fiber 17 wherein the clear aperture of core glass at the distal end of the fiber 17 acts as an aperture. The thermal radiation from a weld pool 11 is imaged on said aperture by the focusing lenses 13 and 15 and delivered through the fiber 17. Then, the thermal radiation is collimated by a lens 19 and is reflected by a dichromatic mirror 21 which transmits the laser beam but reflects the thermal radiation for chromatic filtering. The dichromatic mirror 21 shown in FIG. 2 is reflecting the thermal radiation to be measured, but transmitting the 1.06 um Nd:YAG laser. However, a dichromatic mirror which reflects the 1.06 um Nd:YAG laser, but transmits the thermal radiation to be measured can also be used as a dichromatic mirror to separate the laser and the thermal radiation.

The reflected thermal radiation is divided into three spectral bands with a dichromatic beam splitter 29 which reflects one spectral band but transmits the other two spectral bands. The reflected spectral band is filtered with a band-pass filter 33 with the bandwidth of about one hundredth to about one tenth of the laser wavelength, and focused by a lens 39 on a single-element photodiode detector 45. The transmitted two spectral bands are divided with a dichromatic beam splitter 31 which reflects one spectral band of the transmitted two spectral bands but transmits the other spectral band of the transmitted two spectral bands. The spectral band transmitted by the dichromatic beam splitter 31 is also filtered with a band-pass filter 37 with the bandwidth of about one hundredth to about one tenth of the laser wavelength, and focused by a lens 43 on a single-element photodiode detector 49. The spectral band reflected by the dichromatic beam splitter 31 is also filtered with a band-pass filter 35 with the bandwidth of about one hundredth to about one tenth of the laser wavelength, and focused by a lens 41 on a single-element photodiode detector 47. If the bandwidths of the band-pass filers 33, 35 and 37 become too narrow, the detector signals become too small to be detected with single-element photodiode detectors. However, if the bandwidths of the band-pass filers 33, 35 and 37 become too wide, the chromatic filtering becomes blurred and the chromatic filtering loses the accuracy. The detector outputs from the three detectors 45, 47 and 49 are connected to a processing computer 53 through an interface 51. The process computer 53 controls the position of a translator 57 through a driver 55 and also controls the output power of the laser 27 through a power controller 61. The interface 51 samples the detector signals of all three spectral bands digitally. The digitization resolution should be higher than 8 bits to maintain the accuracy of the digitized data in processing. However, if it is higher than 16 bits, the data processing speed will become slow. The 12 to 16 bits of digitization resolution is good enough to maintain the accuracy and keep the fast data processing speed. The sampling rate should also be high enough to monitor the size variation for weld process control and control the focus shift for precision welding. It is required that the sampling interval should be less than 100 msec for the weld process control. The time interval of between 5 msec to 50 msec is preferred. Finally, the interface 51 should be able to adjust the sampling interval. The processing computer 53 should store the digitized spectral band signals, process the digitized spectral band signals and analyze the processed signals between the sampling interval for monitoring the size variation and the focus shift of a weld pool 11 in a laser welding.

In a laser welding, a weld pool is generated on a workpiece by a focused laser beam delivered through a focusing lens or lenses and through an aperture which limits a size of the laser beam. Then, the detector signal of each spectral band measured with a single-element detector is the integration of the multiplication of the emission intensity from each point source of a weld pool at the wavelength of said spectral band and the transmittance of said wavelength at the position of said point source over the field of view of said single-element detector at said wavelength. Therefore, if the detector signals of different spectral bands are separated by dichromatic beam splitters and band-pass filters, the variations in the field of view between the different spectral bands can provide some information on the size variation of a weld pool. Furthermore, the transmittance at the wavelength of each spectral band also depends on the focus shift of said workpiece and the variation in said transmittance by the focus shift can be used for the monitoring of the focus shift of a workpiece.

To be more quantitative, a weld pool can be approximated as a uniform thermal radiation source at temperature T °K. It is well known in the art that the Planck's blackbody radiation equation can be approximated by the Wien's law if the multiplication of the wavelength of a spectral band in microns and the temperature of a radiation source in °K, $\lambda T$, is much smaller than 14380 um°K. In laser welding, the temperature of a weld pool is near 2000° K and the Wien's law can be applicable from the visible to the near infrared of up to 1500 nm. A Silicon photodiode has a high sensitivity in the visible range and up to 1000 nm and an InGaAs photodiode has a high sensitivity from 1000 nm and up to 1700 nm. Therefore, a Silicone photodiode is preferred in the visible range and up to in the near infrared up to 1000 nm and an InGaAs photodiode is preferred in the near infrared range from 1000 nm to 1700 nm.

If a thermal radiation is measured at one wavelength $W_1$ quite near to the laser wavelength to have the same chromatic aberration as the laser wavelength but quite far from the laser wavelength to be separated from the laser by a dichromatic mirror and an optical band-pass filter during a laser welding and at the other wavelength $W_2$ quite far from $W_1$ to introduce a large chromatic aberration on a focusing lens or lenses with some chromatic aberration but minimum spherical aberration because the blurring due to the spherical aberration degrades the accuracy of the chromatic filtering, the signal of a spectral band measured at a detector can be described as shown below. The wavelength $W_1$ is preferably within about one tenth and up to about two tenths of the laser wavelength.

The signal of a spectral band at wavelength $W_1$ becomes $$X = C_1 \text{Exp}\left(\frac{-14380}{W_1 T}\right) \int_0^{r_0} t_1 r \, dr \qquad (1)$$

$$= C_1 \text{Exp}\left(\frac{-14380}{W_1 T}\right) F(W_1, r_0)$$

where $C_1$ is a constant, T is the temperature of a weld pool in °K, $W_1$ is the wavelength in microns and $t_1$ is the transmittance function at wavelength $W_1$ and $r_0$ is the radius of a weld pool.

Likewise, the signal of a spectral band at wavelength $W_2$ becomes $$Y = C_2 \text{Exp}\left(\frac{-14380}{W_2 T}\right) \int_0^{r_0} t_2 r \, dr \qquad (2)$$

$$= C_2 \text{Exp}\left(\frac{-14380}{W_2 T}\right) F(W_2, r_0)$$

where $C_2$ is a constant, T is the temperature of weld pool in °K, $W_2$ is the wavelength in microns, $t_2$ is the transmittance function at wavelength $W_2$ and $r_0$ is the radius of a weld pool.

If the spectral band signals X,Y and X',Y' are measured with some time interval, the ratios of the spectral band signals expressed in natural logarithm are $$\ln(X/X') = \frac{14380}{W_1}\left(\frac{1}{T'} - \frac{1}{T}\right) + \ln(F(W_1, r_0)) - \ln(F(W_1, r_0')) \qquad (3)$$

$$\ln(Y/Y') = \frac{14380}{W_2}\left(\frac{1}{T'} - \frac{1}{T}\right) + \ln(F(W_2, r_0)) - \ln(F(W_2, r_0')) \qquad (4)$$

where T' and $r_0'$ are the temperature and the weld pool size after the time interval, respectively.

If the temperature dependent parts are canceled out, $$W_2 \ln(Y/Y') - W_1 \ln(X/X') = [W_2 \ln(Y) - W_1 \ln(X) + C_3] - \qquad (5)$$

$$[W_2 \ln(Y') - W_1 \ln(X') + C_3]$$

$$= W_2[\ln(F(W_2, r_0)) - \ln(F(W_2, r_0'))] -$$

$$W_1[\ln(F(W_1, r_0)) - \ln(F(W_1, r_0'))]$$

$$= [W_2 \ln(F(W_2, r_0)) - W_1 \ln(F(W_1, r_0))] -$$

$$[W_2 \ln(F(W_2, r_0')) - W_1 \ln(F(W_1, r_0'))]$$

$$= S(W_1, W_2, r_0) - S(W_1, W_2, r_0')$$

where $C_3$ is a constant determined by the gain of the detectors and the constants $C_1$ and $C_2$.

The measurable quantity of $[W_2 \ln(Y) - W_1 \ln(X) + C_3]$ can not be compared directly to the calculated value of $S(W_1, W_2, r_0)$, which is a function of the radius of a weld pool and can be calculated on a basis of optical design parameters of the focusing lens or lenses and the aperture, to determine the size of a weld pool due to the unknown constant $C_3$. However, the difference in any two measurable values of $[W_2 \ln(Y) - W_1 \ln(X) + C_3]$ can be directly compared to the difference in the calculated values of $S(W_1, W_2, r_0)$ at the corresponding two weld pool sizes. It means that we have to know the value of $[W_2 \ln(Y) - W_1 \ln(X) + C_3]$ at at least one weld pool size for reference. Then, we can determine the weld pool size to be measured by comparing the difference in the measured value and the known value at the reference of $[W_2\ln(Y)-W_1\ln(X)+C_3]$ to the difference in the calculated values of $S(W_1, W_2, r_0)$ to locate the weld pool size to be measured.

If the function $S(W_1, W_2, r_0)$ has a maximum or a minimum at a radius $R_0$, it means that the measured value of $[W_2\ln(Y)-W_1\ln(X)+C_3]$ would be maximum or minimum at a weld pool with the same radius $R_0$. If a radius of a weld pool varies in a laser welding and passes the radius of $R_0$ such as in the cooling process between the laser pulses in a pulsed laser welding or at the beginning of a laser welding in a continuous laser welding, the measured signal of $[W_2\ln(Y)-W_1\ln(X)+C_3]$ at the weld pool radius of $R_0$ can be used as a reference in the size monitoring of a weld pool.

To be more quantitative, if $S(W_1, W_2, r_0)$ is differentiated with $r_0$, $$d(S(W_1, W_2, r_0))/dr_0 = 2\pi r_0 [\{t_2(r_0) \times W_2\}/F(W_2, r_0) - \{t_1(r_0) \times W_1\}/F(W_1, r_0)]. \quad (6)$$

It can be zero and $S(W_1, W_2, r_0)$ can have a maximum or a minimum at a weld pool radius $R_0$ if $$H(R_0) = [t_1(R_0)/F(W_1, R_0)]/[t_2(R_0)/F(W_2, R_0)] \quad (7)$$
$$= W_2/W_1.$$

Figure 3:
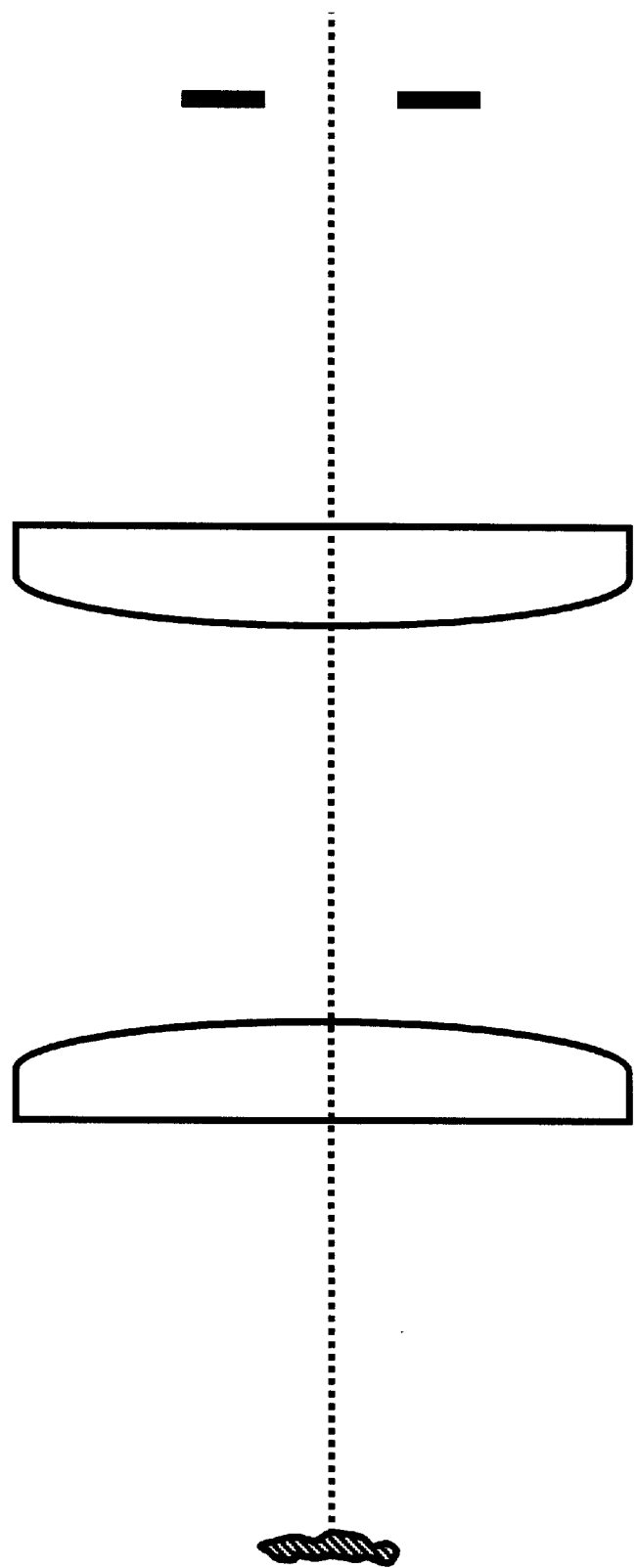
FIG. 3 shows a focusing lens system used in the explanation of the present invention.
Figure 4:
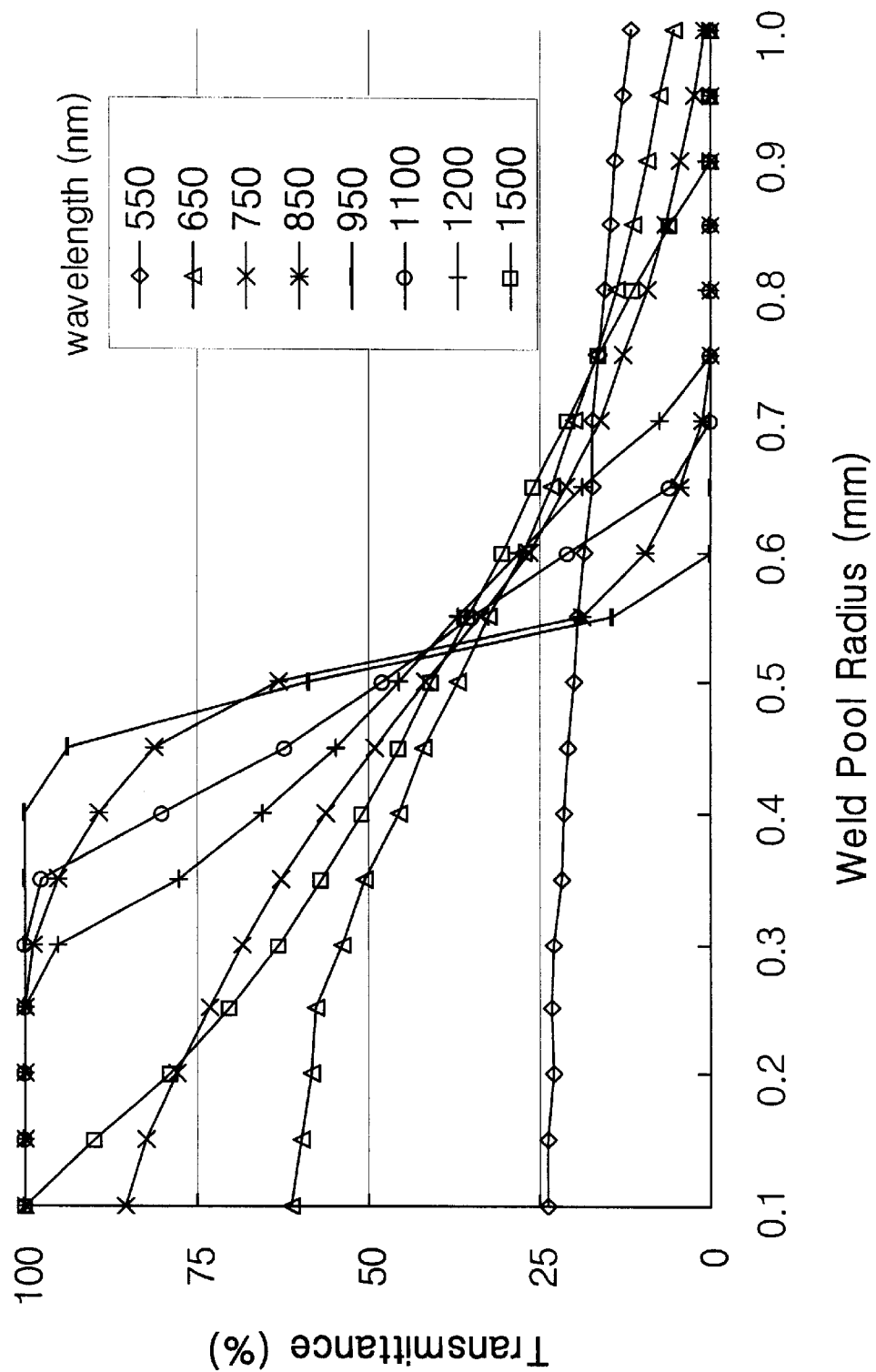
FIG. 4 shows the transmittance function of thermal radiation as a function of weld pool radius at a plurality of wavelengths.
Figure 5:
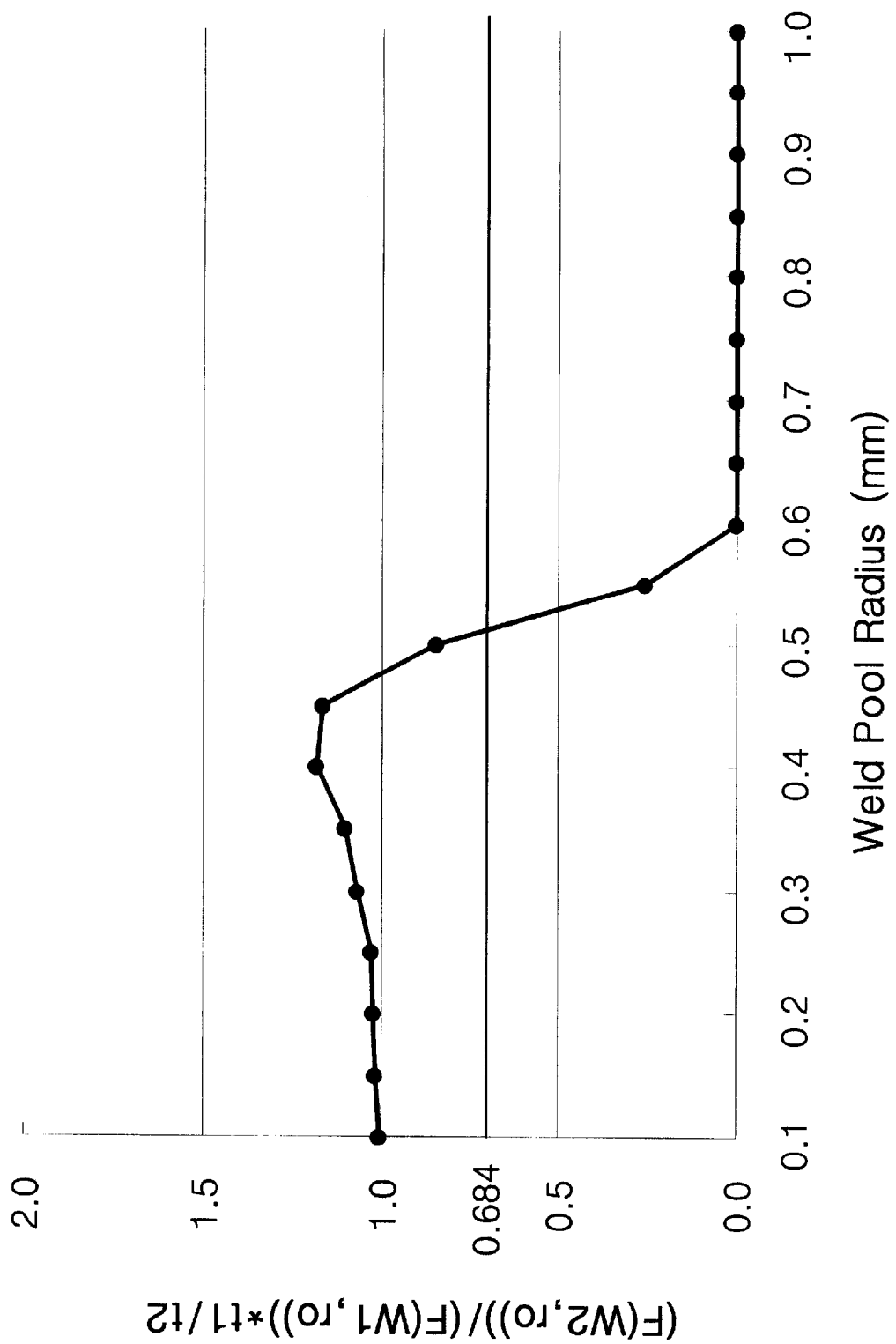
FIG. 5 shows H(r) function for the focusing lens system shown in FIG. 3 wherein $W_1$ is equal to 950 nm and $W_2$ is equal to 650 nm.
Figure 6:
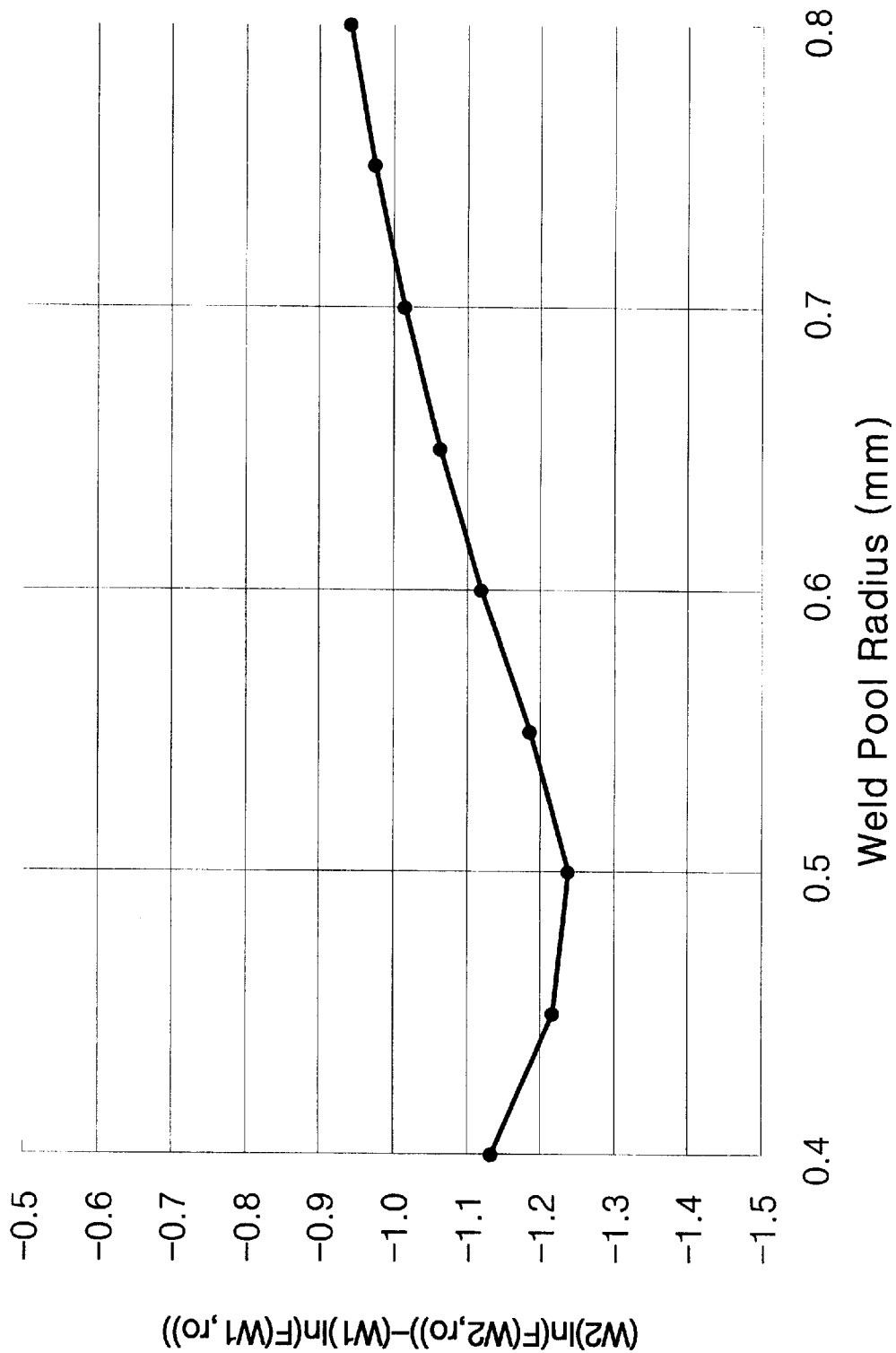
FIG. 6 shows $S(W_1, W_2, r_0)$ function in focus for the focusing lens system shown in FIG. 3 wherein $W_1$ is equal to 950 nm and $W_2$ is equal to 650 nm.
Figure 7:
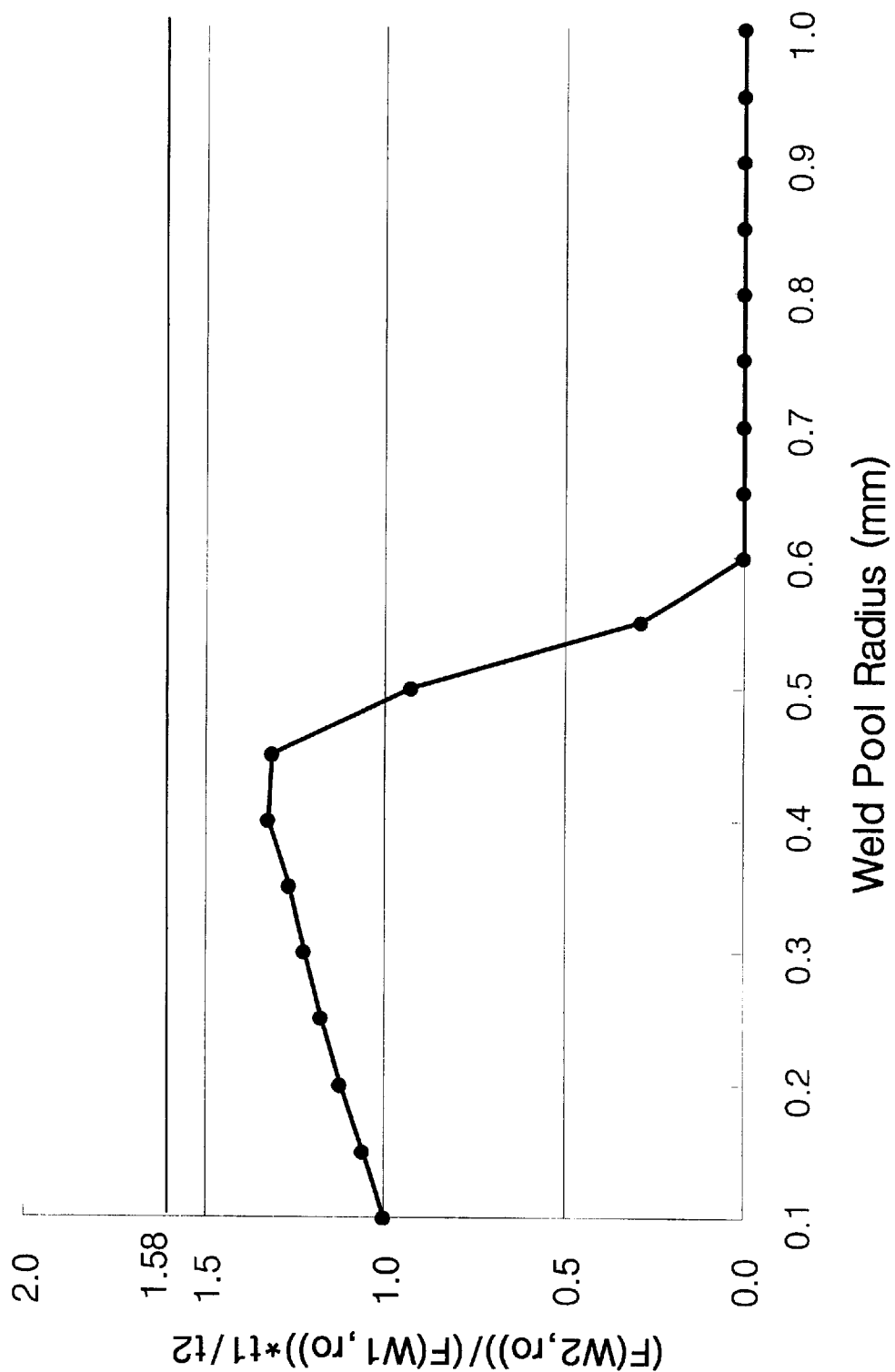
FIG. 7 shows H(r) function for the focusing lens system shown in FIG. 3 wherein $W_1$ is equal to 950 nm and $W_2$ is equal to 1500 nm.
Figure 8:
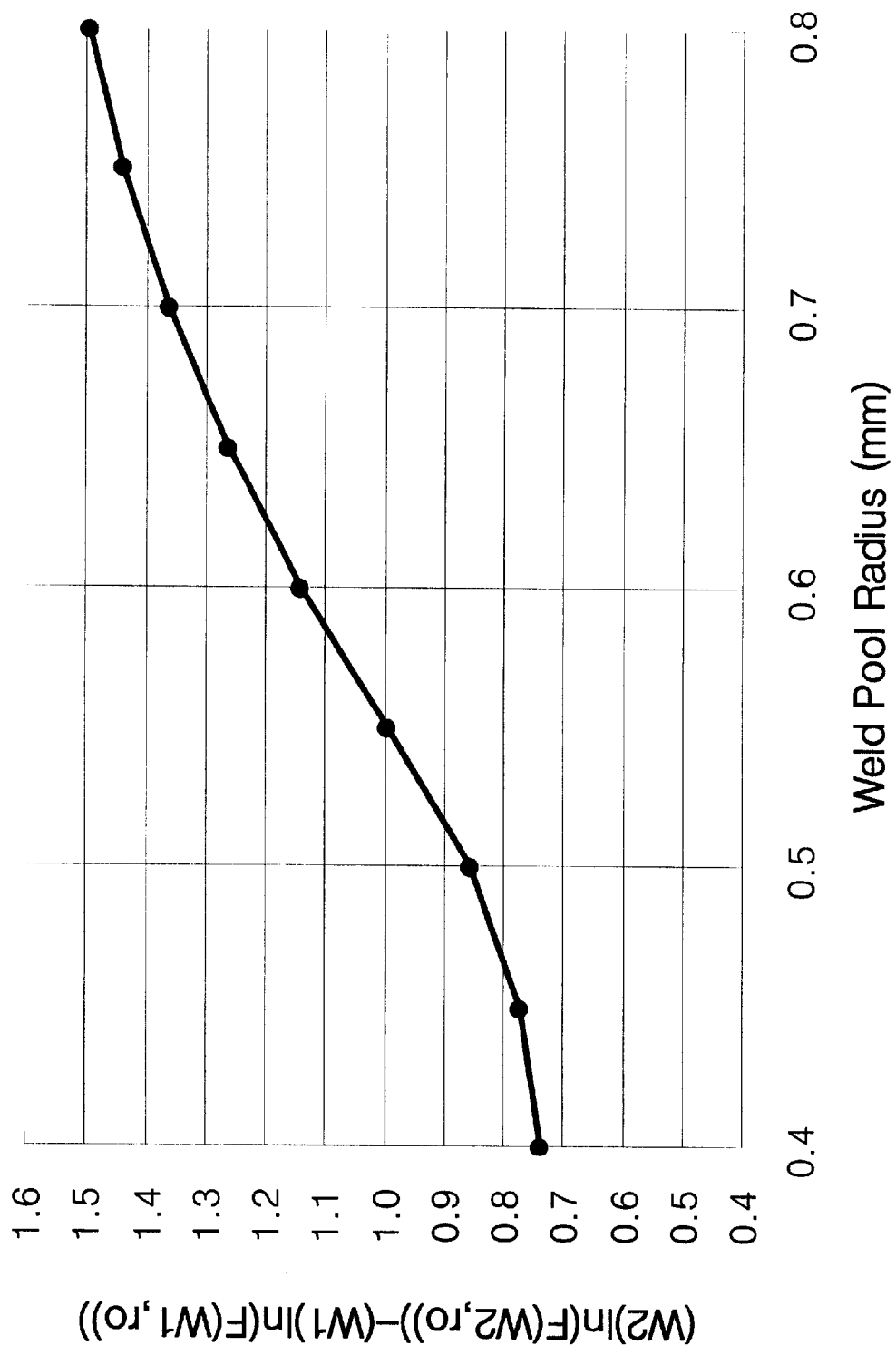
FIG. 8 shows $S(W_1, W_2, r_0)$ function in focus for the focusing lens system shown in FIG. 3 wherein $W_1$ is equal to 950 nm and $W_2$ is equal to 1500 nm.

FIG. 3 shows an optical system used in the following analysis of the chromatic filtering. Two lenses made of high index refraction SF11 glass with F/3.8 and 100 mm focal length, 1 mm aperture size and 1 mm weld pool size is assumed. The plano-convex type of the lenses reduces the spherical aberration near the minimum value. FIG. 4 shows the transmittance function t as a function of a weld pool radius at several wavelengths. The transmittance function t has 100% transmission near the center of a weld pool and reduces to zero as the radius becomes larger. The wavelength $W_1$ is quite near the laser wavelength and $t_1$ becomes zero at a radius near the radius of focused laser spot. On the other hand, the wavelength $W_2$ is quite far from the laser wavelength and $t_2$ becomes zero at a radius much larger than the radius of focused laser spot. The H(r) at r=0 is equal to 1 because the transmittances at both wavelengths is 100% at r=0 and H(r) becomes zero at a radius near the radius of focused laser spot. Therefore, if $W_2<W_1$, then there is a $R_0$ near the radius of focused laser spot which can satisfies $H(R_0)=W_2/W_1$. FIG. 5 shows H(r) for the optical system shown in FIG. 3 wherein $W_1$ is equal to 950 nm and $W_2$ is equal to 650 nm. It shows the minimum occurs near the radius of focused laser spot when H(r)=650/950=0.684. FIG. 6 shows $S(W_1, W_2, r_0)$ in focus for the optical system shown in FIG. 3 wherein $W_1$ is equal to 950 nm and $W_2$ is equal to 650 nm. The $S(950, 650, r_0)$ has a minimum at the radius $r_0$ satisfying $H(r_0)=0.684$. FIG. 7 shows H(r) for the optical system shown in FIG. 3 wherein $W_1$ is equal to 950 nm and $W_2$ is equal to 1500 nm. It shows that there is no minimum nor maximum because H(r) is always less than 1.58 (1500/950=1.58). FIG. 8 shows $S(W_1, W_2, r_0)$ in focus for the optical system shown in FIG. 3 wherein $W_1$ is equal to 950 nm and $W_2$ is equal to 1500 nm. The $S(950, 1500, r_0)$ increases as the radius of a weld pool increases.

In a pulsed laser welding, the minimum value of $[W_2\ln(Y)-W_1\ln(X)+C_3]$ signal can be measured by measuring it repetitively until the weld pool size is reduced down to the size minimizing $S(950, 650, r_0)$. Usually, this occurs in the cooling process between the laser pulses. Then, this minimum value is used in the size monitoring of all other measurements in that one pulse. In a continuous laser welding, a weld pool size is growing at the beginning and becomes larger than the size minimizing $S(950, 650, r_0)$. Therefore, if $[W_2\ln(Y)-W_1\ln(X)+C_3]$ signal is measured repetitively, the minimum value of $[W_2\ln(Y)-W_1\ln(X)+C_3]$ signal can be obtained at the beginning and can be used for the size monitoring of all other measurements.

Figure 9:
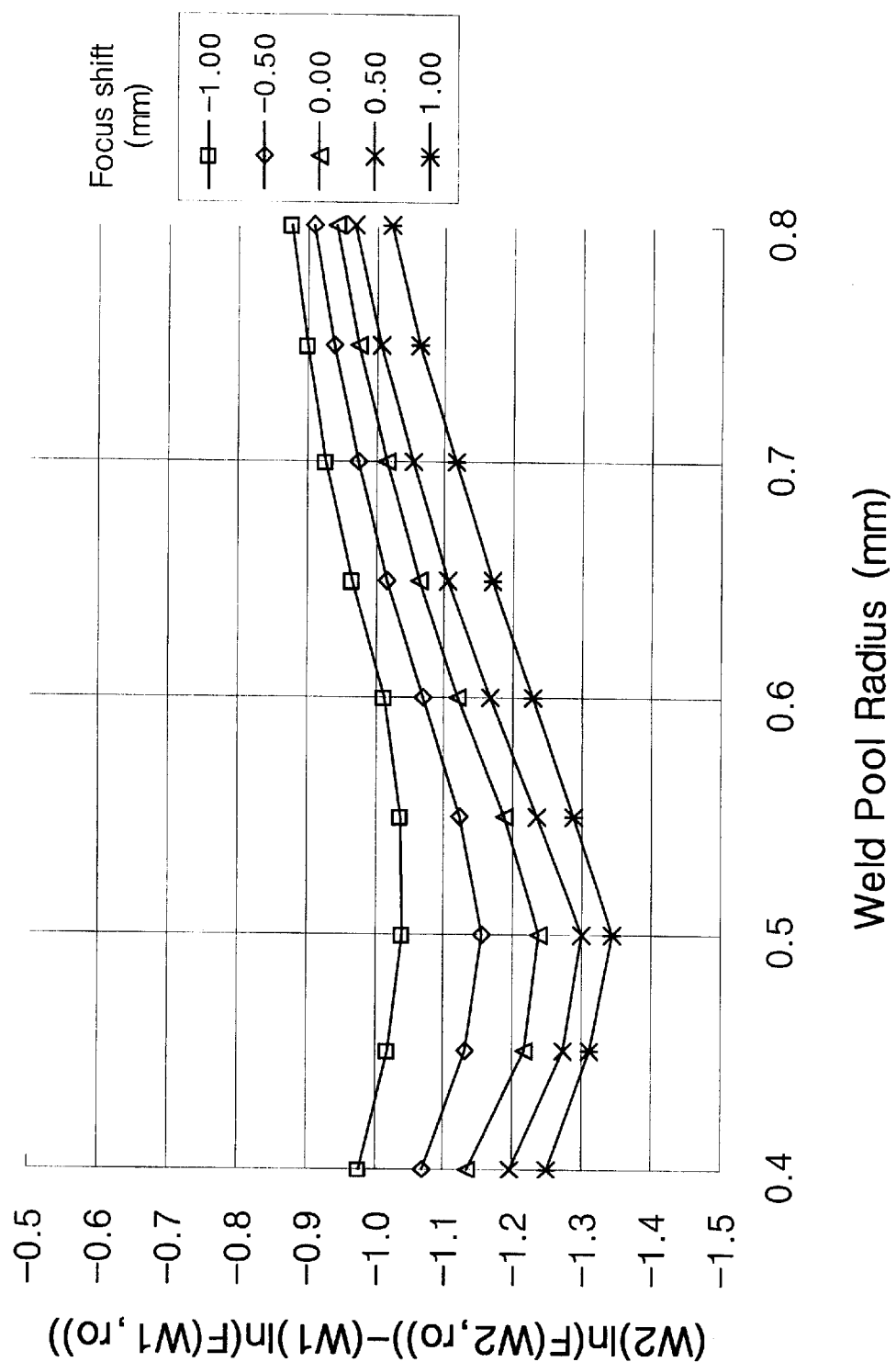
FIG. 9 shows the dependence of $S(950, 650, r_0)$ function on the focus shift of a weld pool.
Figure 10:
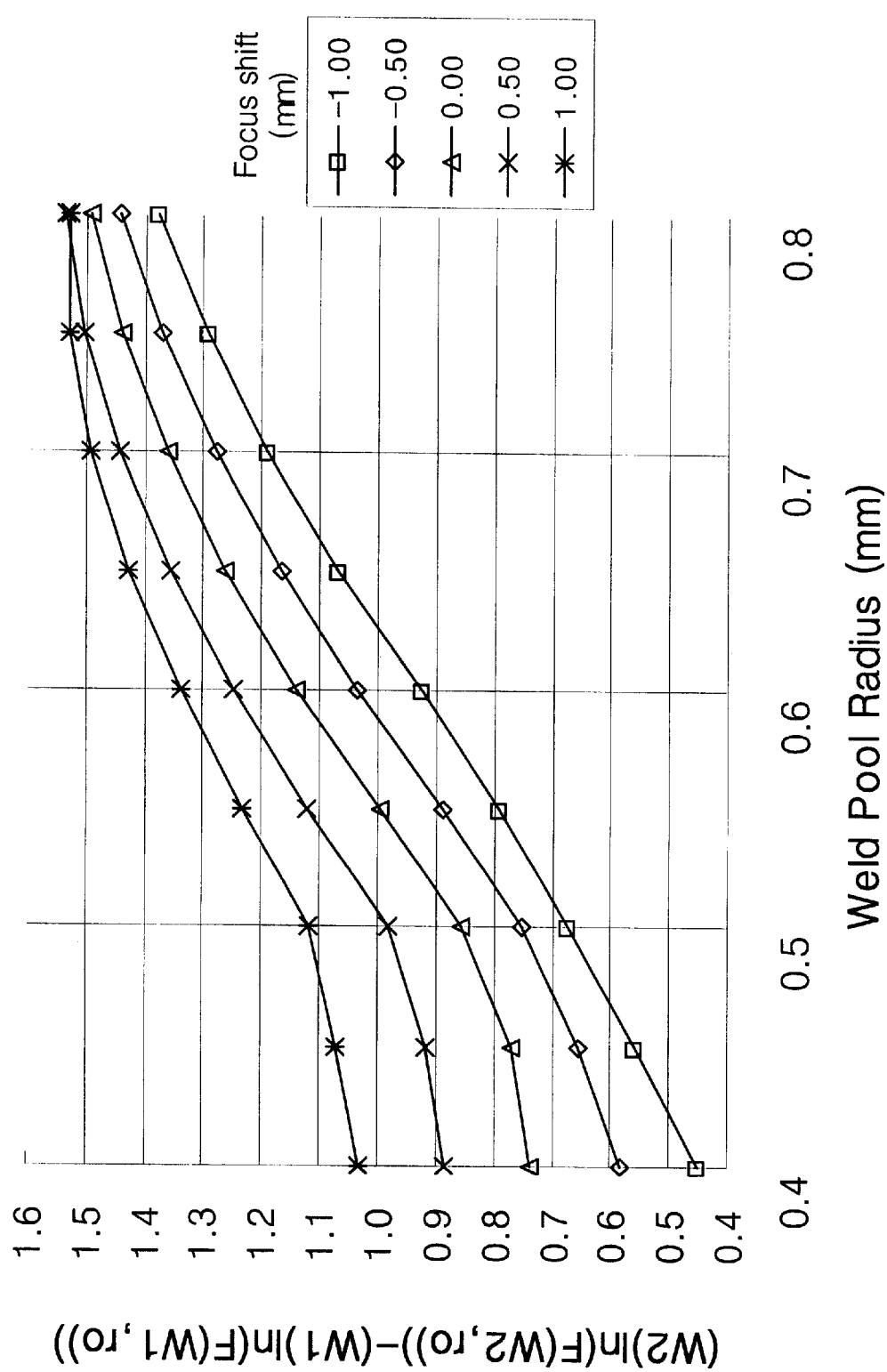
FIG. 10 shows the dependence of $S(950, 1500, r_0)$ function on the focus shift of a weld pool.

Up to now, the effect of focus shift of a weld pool on the size monitoring is not considered. FIG. 9 and FIG. 10 show the dependence of $S(950, 650, r_0)$ and $S(950, 1500, r_0)$ on the focus shift of a weld pool. The curves in FIG. 9 have same shape but shifted by the focus shift. Therefore, in a pulsed laser welding, the same technique can be used in the size monitoring of a weld pool because there is no focus shift introduced between the minimum measurement and the other measurements related to one single pulse even if there will be some focus shift introduced between one pulse and the other pulse measured with time interval. The reference can be measured for each laser pulse in a pulsed laser welding. Therefore, the focus shift does not introduce much error on the size monitoring automatically in a pulsed laser welding.

Figure 11:
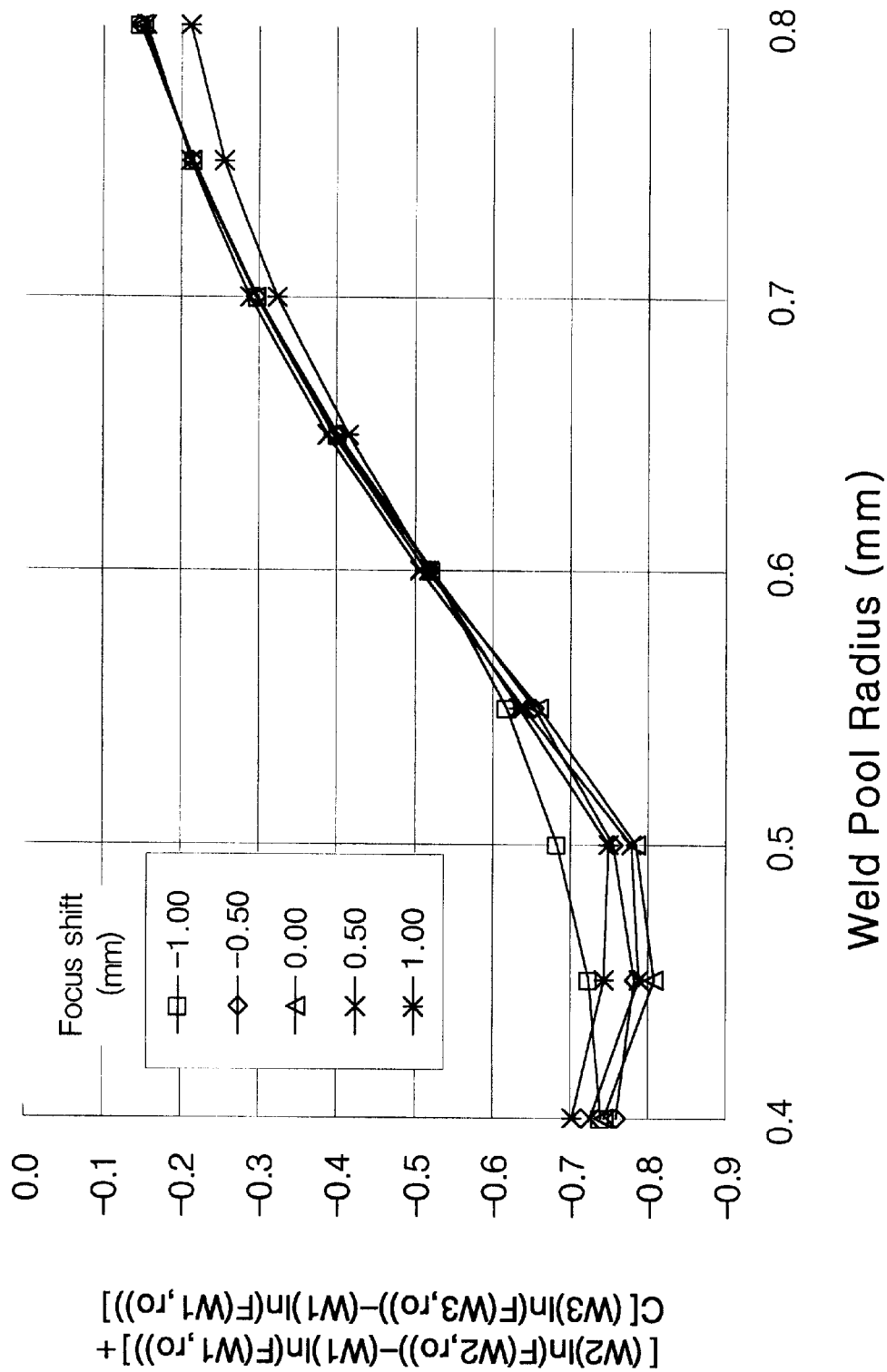
FIG. 11 shows the focus shift dependence of a size variation function wherein $W_1$ is equal to 950 nm, $W_2$ is equal to 650 nm, $W_3$ is equal to 1500 nm and the focus shift compensating constant C is equal to 0.53.

However, in a continuous laser welding, the reference can be measured only once at the beginning and the other measurement with some time interval will be affected by the focus shift introduced between the two measurements. Therefore, an algorithm which can compensate the error introduced by a focus shift is needed. The focus shift dependence in FIG. 9 and the focus shift dependence in FIG. 10 show a different sign. One shows a positive dependence and the other shows a negative dependence. However, the sensitivities for the size variation monitoring of FIG. 9 and FIG. 10 have the same sign for a weld pool size near and larger than the focused laser spot size which is the weld pool size of interest used in a conventional laser welding. Therefore, the $S(950, 650, r_0)$ minus the $S(950, 1500, r_0)$ multiplied by a focus shift compensating constant wherein the focus shift compensating constant is determined to compensate the focus shift error can be used for monitoring of the size variation of a weld pool. FIG. 11 shows a size variation function which is the $S(950, 650, r_0)$ minus the $S(950, 1500, r_0)$ multiplied by the focus shift compensating constant of −0.53. It shows that the $S(950, 650, r_0)$ minus the $S(950, 1500, r_0)$ multiplied by the focus shift compensating constant of −0.53 can be used in the monitoring of the size variation of a weld pool by comparing it with the measured values of a size variation signal which is $[W_2\ln(Y)-W_1\ln(X)]+0.53\times[W_3\ln(Z)-W_1\ln(X)]$ wherein $W_1$, $W_2$, and $W_3$ are 950 nm, 650 nm and 1500 nm respectively and X,Y,Z are the spectral band signal at 950 nm, 650 nm and 1500 nm respectively. FIG. 11 shows that the size variation of a weld pool can be measured with minimum error induced from a focus shift for a range of weld pool size from the focused laser spot size up to about the 1.5 times of the focused laser spot size which covers the weld pool size of interest in industrial laser welding. It means that the size variation can be monitored independently from the focus shift. The minimum of the size variation function near the focused laser spot size can be used as a reference in the size variation monitoring.

As to the monitoring of the focus shift of a weld pool, the dependence of spectral band signals on the focus shift of a weld pool can be used. However, the ratio of two spectral band signals is preferred to the difference of two spectral band signals because the ratio does not depend on the intensity variation of the spectral band signals due to the power variation of a laser. Furthermore, if the change in the ratio of two spectral band signals is monitored by division not by subtraction, then the result does not depend on the variations in the gains of single-element detectors. These advantages can be obtained by comparing the natural logarithm of the ratio of two spectral band signals by subtraction.

From Eqs. (1) and (2), a focus shift signal which is the natural logarithm of the ratio of two spectral band signals, X over Y, can be expressed as $$\ln(X/Y) = \ln(C_1/C_2) + \frac{14380}{T}\left(\frac{1}{W_2} - \frac{1}{W_1}\right) + [\ln(F(W_1, r_0)) - \ln(F(W_2, r_0))] \quad (8)$$

It is known that the temperature fluctuation induced by a laser power variation is small in a laser welding, but a laser power variation induces a size variation of a weld pool in a laser welding. Therefore, the weld pool size dependence of a focus shift function of $\ln(F(W_1, r_0)) - \ln(F(W_2, r_0))$ in the third term in Eq. (8) has to be minimized. Then, the focus shift dependence of the third term in Eq. (8) can be used for the monitoring of the focus shift of a weld pool independently from the size variation of a weld pool. It means that the differentiation of $[\ln(F(W_1, r_0)) - \ln(F(W_2, r_0))]$ with $r_0$ should be zero at the weld pool radius of interest.

$$d(\ln(F(W_1, r_0)) - \ln(F(W_2, r_0)))/dr_0 = 2\pi r_0[t_1(r_0)/F(W_1, r_0) - t_2(r_0)/F(W_2, r_0)] \quad (9)$$

Figure 12:
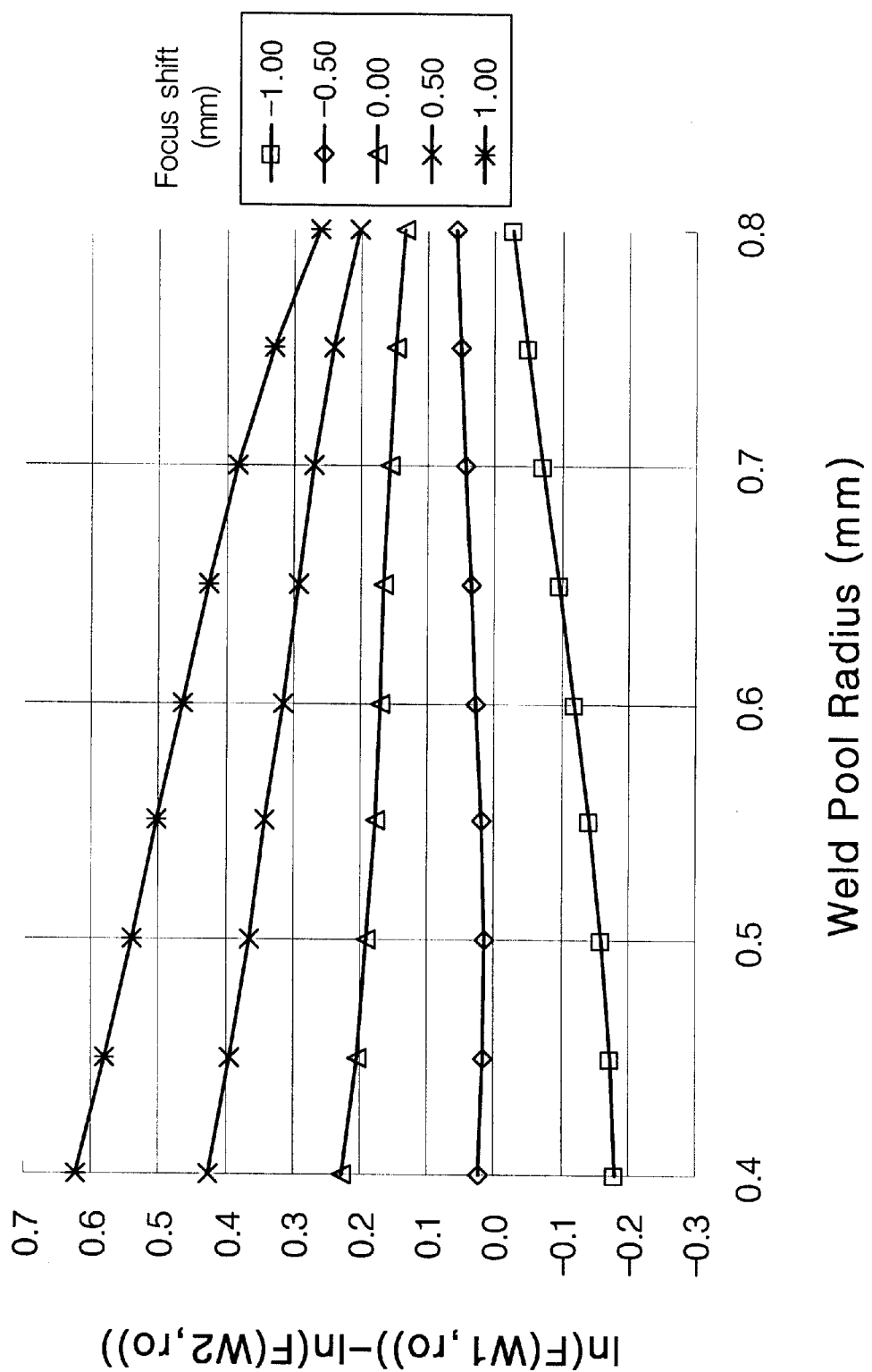
FIG. 12 shows the focus shift dependence of a focus shift function wherein $W_1$ is equal to 650 nm and $W_2$ is equal to 1500 nm.

The $d(\ln(F(W_1, r_0)) - \ln(F(W_2, r_0)))/dr_0$ in Eq. (9) can be zero if the shape of $t_1(r_0)$ is as same as the shape of $t_2(r_0)$. In other words, we have to choose the two wavelengths of the spectral bands so that the transmittances of the spectral bands at two wavelengths should be as same as possible. This condition can be satisfied by selecting one wavelength in the shorter wavelength and the other wavelength in the longer wavelength than the laser wavelength. Furthermore, the wavelengths should be far enough from the laser wavelength to introduce large chromatic aberration. For an optical system shown in FIG. 3, the transmittances at 650 nm and 1500 nm are nearly the same as shown in FIG. 4. FIG. 12 shows the focus shift dependence of $\ln(F(W_1, r_0)) - \ln(F(W_2, r_0))$ for a plurality of focus shifts wherein $W_1$ is 650 nm and $W_2$ is 1500 nm. It shows that the monitoring of the focus shift of a weld pool is not affected by the size variation induced by laser power variation for a weld pool size range from the focused laser spot size of 1 mm up to the 1.5 times the focused laser spot size which covers the size variation of interest occurred in industrial applications.

If the curvatures and materials of focusing lens or lenses are known, we can select one wavelength such as 1500 nm which is much longer than the laser wavelength of 1.06 um to show enough chromatic aberration but is still within the detectable range of an InGaAs photodiode and another wavelength which is shorter than the laser wavelength of 1.06 um but has the same transmittance function as 1500 nm. On the other hand, if the curvatures and materials of focusing lens or lenses are unknown, we can select the same 1500 nm as one wavelength and find the shorter wavelength by experiment which shows minimum dependence on a laser power variation during a laser welding with some laser power variation but without any focus shift.

Now, the two wavelengths for a focus shift monitoring are determined. These two wavelengths can be used for a size variation monitoring with a wavelength near to the 1.06 um laser wavelength such as 950 nm which can be separated from the 1.06 um with a band-pass filter. If the curvatures and materials of focusing lens or lenses are unknown, we can not calculate the focus shift compensating constant to compensate the focus shift dependences of a size variation signal obtained from 950 nm and 1500 nm and another size variation signal obtained from 950 nm and the shorter wavelength which shows minimum dependence on a laser power variation in a focus shift monitoring. However, the focus shift compensating constant can be determined experimentally by measuring the two size variation signals simultaneously when the size variation signal obtained from 950 nm and the shorter wavelength becomes maximum or minimum as laser power is varied while the distance between a focusing lens and a weld pool is maintained at focal distance, varying the distance between a focusing lens and a weld pool by a small amount to show focus shift dependence, measuring again the two size variation signals simultaneously when the size variation signal obtained from 950 nm and the shorter wavelength becomes maximum or minimum as laser power is varied while the distance between a focusing lens and a weld pool is maintained at the varied distance and then dividing the difference in the size variation signal obtained from 950 nm and the shorter wavelength by the difference in the size variation signal obtained from 950 nm and 1500 nm. It is important the two size variation signals are measured simultaneously when the size variation signal obtained from 950 nm and the shorter wavelength becomes maximum or minimum because we can not find the reference point to measure the signal in the size variation signal obtained from 950 nm and 1500 nm.

Although the present invention has been described in considerable detail with reference to certain preferred versions thereof, many modifications and changes will occur to those skilled in the art. It is, therefore, understood that the appended claims are intended to cover all such modifications and changes which fall within the spirit and scope of the invention.

What is claimed is:

1. In a method for monitoring the size variation and the focus shift of a weld pool simultaneously or either the size variation or the focus shift of a weld pool in a laser welding wherein a laser beam is transmitted through an aperture which limits a size of a laser beam, said transmitted laser beam is focused with at least one lens with some chromatic aberration but minimum spherical aberration on a workpiece, a thermal radiation from a weld pool is measured through the at least one lens and through the aperture or any other aperture limiting a size of a weld pool, the thermal radiation and the laser beam reflected from the workpiece is separated with a dichromatic mirror, the thermal radiation is split with dichromatic beam splitters into three spectral bands, each spectral band of the thermal radiation is filtered with a narrow band-pass optical filter each narrow band-pass filtered thermal radiation is detected with a single-element detector as an electrical signal, electrical signals are sampled as detector signals from the single-element detectors digitally, a plurality of digitized detector signals are processed as processed signals so that the processed signals generate a digital signal, a size variation signal, and/or another digital signal, a focus shift signal, and a size error signal representative of the size variation of a weld pool and/or a focus error signal representative of the focus shift of a weld pool is generated from the size variation signal and the focus shift signal, the improvement comprising the steps of:

selecting optimized wavelengths of said spectral bands experimentally so that said focus shift signal is generated independently from a laser power variation; and compensating a focus shift dependence in size variation monitoring experimentally so that said size variation signal is generated independently from a focus shift of said weld pool.

2. The method of claim 1, wherein a wavelength which is longer than a laser wavelength used in a laser welding to show enough chromatic aberration but is still within the detectable range of a single-element detector is selected as one wavelength of two spectral bands for focus shift monitoring and a wavelength which is shorter than said laser wavelength and shows minimum dependence on a laser power variation during a laser welding experiment with said laser power variation but without any focus shift is selected as the other wavelength of two spectral bands for focus shift monitoring.

3. The method of claim 1 or claim 2, wherein both a focus shift dependence of a size variation signal obtained from a wavelength near to said laser wavelength and said wavelength which is longer than said laser wavelength to show enough chromatic aberration but is still within the detectable range of a single-element detector and another focus shift dependence of another size variation signal obtained from said wavelength near to said laser wavelength and said wavelength which is shorter than said laser wavelength and shows minimum dependence on a laser power variation in a focus shift monitoring are measured experimentally and said focus shift dependences of both size variation signals are compensated.

4. The method of claim 3, wherein experimentally measuring and compensating said focus shift dependences of said size variation signals comprises the steps of:

measuring a size variation signal obtained from a wavelength near to said laser wavelength and said wavelength which is longer than said laser wavelength to show enough chromatic aberration but is still within the detectable range of a single-element detector and another size variation signal obtained from said wavelength near to said laser wavelength and said wavelength which is shorter than said laser wavelength and shows minimum dependence on a laser power variation in a focus shift monitoring simultaneously when said another size variation signal obtained from said wavelength near to said laser wavelength and said wavelength which is shorter than said laser wavelength and shows minimum dependence on a laser power variation in a focus shift monitoring becomes maximum or minimum as laser power is varied while the distance between a focusing lens and a weld pool is maintained at focal distance;

varying the distance between a focusing lens and a weld pool by a small amount to show focus shift dependence;

measuring again a size variation signal obtained from a wavelength near to said laser wavelength and said wavelength which is longer than said laser wavelength to show enough chromatic aberration but is still within the detectable range of a single-element detector and another size variation signal obtained from said wavelength near to said laser wavelength and said wavelength which is shorter than said laser wavelength and shows minimum dependence on a laser power variation in a focus shift monitoring simultaneously when said another size variation signal obtained from said wavelength near to said laser wavelength and said wavelength which is shorter than said laser wavelength and shows minimum dependence on a laser power variation in a focus shift monitoring becomes maximum or minimum as laser power is varied while the distance between a focusing lens and a weld pool is maintained at said varied distance; and obtaining a focus-shift-independent size variation signal by subtracting said size variation signal, obtained from a wavelength near to said laser wavelength and said wavelength which is longer than said laser wavelength, multiplied by a constant from said another size variation signal obtained from said wavelength near to said laser wavelength and said wavelength which is shorter than said laser wavelength and shows minimum dependence on a laser power variation in a focus shift monitoring.

5. The method of claim 4, wherein determining said constant comprises the steps of:

calculating a difference in said measured size variation signal, obtained from a wavelength near to said laser wavelength and said wavelength which is longer than said laser wavelength to show enough chromatic aberration but is still within the detectable range of a single-element detector, before and after said variation of the distance between a focusing lens and a weld pool by a small amount to show focus shift dependence said focus is introduced;

calculating a difference in said another measured size variation signal, obtained from a wavelength near to said laser wavelength and said wavelength which is shorter than said laser wavelength and shows minimum dependence on a laser power variation in a focus shift monitoring, before and after said variation of the distance between a focusing lens and a weld pool by a small amount to show focus shift dependence said focus is introduced; and obtaining said constant by dividing said difference in said another measured size variation signal obtained from a wavelength near to said laser wavelength and said wavelength which is shorter than said laser wavelength and shows minimum dependence on a laser power variation in a focus shift monitoring by said difference in said measured size variation signal obtained from a wavelength near to said laser wavelength and said wavelength which is longer than said laser wavelength to show enough chromatic aberration but is still within the detectable range of a single-element detector.

* * * * *